(12) United States Patent
Bondareva et al.

(10) Patent No.: US 12,555,594 B2
(45) Date of Patent: Feb. 17, 2026

(54) SYSTEM AND METHOD FOR TRACKING EMOTIONAL STATE OF A CALLER USING ARTIFICIAL INTELLIGENCE

(71) Applicant: MOTOROLA SOLUTIONS, INC., Chicago, IL (US)

(72) Inventors: Mariya Bondareva, Loxahatchee, FL (US); April L Garrett, Flossmoor, IL (US); Martha Lora, Plantation, FL (US); Jacqueline Mazzeo, New York, NY (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 386 days.

(21) Appl. No.: 18/055,870

(22) Filed: Nov. 16, 2022

(65) Prior Publication Data
US 2024/0161768 A1 May 16, 2024

(51) Int. Cl.
*G10L 25/63* (2013.01)
*H04M 3/51* (2006.01)

(52) U.S. Cl.
CPC .......... *G10L 25/63* (2013.01); *H04M 3/5175* (2013.01)

(58) Field of Classification Search
CPC ....... G10L 25/63; G10L 15/26; H04M 3/5175
See application file for complete search history.

(56) References Cited

U.S. PATENT DOCUMENTS

| | | | |
|---|---|---|---|
| 7,454,350 B2 | 11/2008 | Silverman | |
| 7,565,285 B2 | 7/2009 | Ozdas et al. | |
| 9,521,258 B2 * | 12/2016 | Ripa | G10L 25/48 |
| 9,880,807 B1 * | 1/2018 | Haggerty | G06F 3/167 |
| 11,004,461 B2 | 5/2021 | Howard | |
| 11,750,736 B1 * | 9/2023 | Majdabadi | H04M 3/2281 379/201.02 |
| 2019/0356779 A1 * | 11/2019 | Zimmerman | G06T 11/206 |
| 2019/0385711 A1 | 12/2019 | Shriberg et al. | |
| 2021/0097883 A1 * | 4/2021 | Scott | G06N 20/00 |
| 2021/0352176 A1 * | 11/2021 | Van Den Dungen | A61B 5/1117 |

FOREIGN PATENT DOCUMENTS

| | | | | |
|---|---|---|---|---|
| CN | 107293310 A | * | 10/2017 | G10L 25/63 |
| WO | WO-2020253128 A1 | * | 12/2020 | G10L 25/63 |

OTHER PUBLICATIONS

About. Jun. 2020, Don't Call the Police. (Mar 2, 2023b). (Year: 2020).*
About. Jun. 2020, Don't Call the Police. (Mar. 2, 2023b). (Year: 2020) (Year: 2020).*

* cited by examiner

*Primary Examiner* — Pierre Louis Desir
(74) *Attorney, Agent, or Firm* — Barbara R. Doutre

(57) ABSTRACT

A communication system and method provide for tracking emotional state of a caller during a call center communication using artificial intelligence. A mental health answering point (102) interoperates with an artificial intelligence server (108) wherein the AI server is configured to: extract audio and text features from the call in real time. The AI server calculates and stores stress levels associated with the caller, from the extracted audio features, over time and synchronizes the stored stress levels with the extracted text features from the call. The stress levels are monitored during the call, and visual indicators are provided for high/increasing stress levels and low/decreasing stress levels.

17 Claims, 4 Drawing Sheets

| Stress Level | Displayed Notification 1 | Displayed Notification 2 | Displayed Notification 3 |
|---|---|---|---|
| High/ Increasing | Refrain From Ending Call | Identify/List Text Indicative Of High Stressors Of Caller | Identify/List Text Indicative Of Low Stressors Of Caller |
| Decreasing | Ok To Begin Ending Call | Identify/List Text Associated With High Stressors To Avoid / Refrain | Identify/List Text Indicative Of Low Stressors Of Caller |
| Low | Ok To End Call | | |

FIG. 3

SYSTEM AND METHOD FOR TRACKING EMOTIONAL STATE OF A CALLER USING ARTIFICIAL INTELLIGENCE

FIELD OF THE INVENTION

The present invention relates generally to public safety call center communication systems and more particularly to the application of artificial intelligence in a call center communication system that manages mental health calls.

BACKGROUND

Increased awareness of mental health issues has resulted in the establishment of dedicated call centers which focus on suicide prevention and mental health crises. For example, in the United States, a hotline service known as the 988 Suicide and Crisis Lifeline was established to provide 24/7, confidential support to people in suicidal crisis or mental health-related distress. The 988 Suicide and Crisis Lifeline provides access to trained crisis counselors who can help callers experiencing mental health-related distress, such as thoughts of suicide, mental health disorders, substance use crisis, or any other kind of emotional distress.

Unlike 911 calls which tend to be short, a 988 call may take longer to manage and involve more dialog between the caller and the 988 call taker. Also, a 911 call typically ends when an incident is either resolved or emergency personnel arrive on-scene—whereas 988 calls may cover various topics and take place with different call takers.

The ability of a 988 call taker to manage different types of calls can be challenging. Assistance to the call taker in tracking changes to a caller's current emotional state throughout a call would be highly beneficial in facilitating the call taker's ability to bring about a positive outcome to the call.

Accordingly, there is a need for tracking a caller's emotional state during a call to a mental health center.

BRIEF DESCRIPTION OF THE FIGURES

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 3 is a table of stress level and notification options in accordance with some embodiments.

Figure 1:
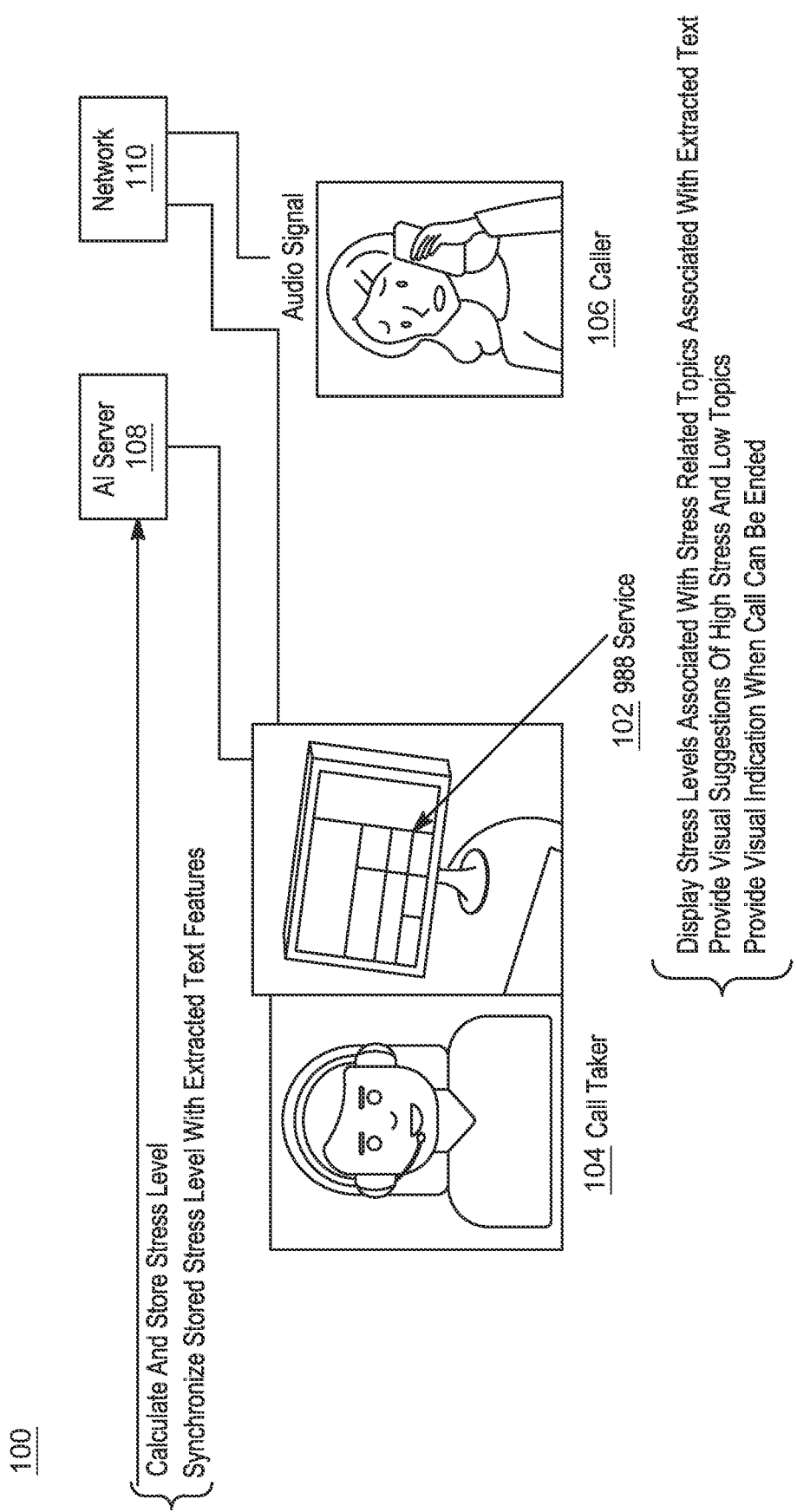
FIG. 1 is a communication system block diagram for tracking the emotional state of a caller to a mental health answering point in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, there is provided an artificial intelligence (AI) supported method and system for tracking and managing an emotional health state of a caller during a call to an answering point. The method and system include acquiring an audio signal from the call relating to a conversation between the caller and a mental health call taker; identifying the caller in the audio signal; extracting audio and text features from the call in real time; and calculating and storing stress levels of the caller, from the extracted audio features, over time and synchronizing the stored stress levels with the extracted text features from the call. When one of a current calculated stress level of the caller is relatively high or a trend of the calculated stress level of the caller is increasing, the method and system provide a visual indication to the call taker, at the answering point, to refrain from ending the call. When one of a current calculated stress level of the caller is relatively low or a trend of the calculated stress level of the caller is decreasing, the method and system provide a visual indication to the call taker, at the answering point, that the call can be ended.

The embodiments advantageously facilitate independent handling of calls to mental health call centers without reliance on 911 dispatch support.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 is a block diagram of a communication system 100 formed and operating in accordance with some embodiments. Communication system 100 includes a mental health call service, such as a 988 call service, mental health support line, or other mental health answering point 102, in which a call taker 104 manages calls associated with mental health struggles from a caller 106. In accordance with the embodiments, the answering point 102 interoperates with an artificial intelligence server 108 and communicates over a communications network 110. The answering point 102 may be any broadband or narrowband device having a microprocessor, transceiver, and audio circuitry, such as a radio, a cell phone or the like, for receiving verbal inputs, from the caller taker 104 and the caller 106, for transmission to the AI server 108. The AI server 108 comprises language processing capability which, in accordance with the embodiments, calculates and stores stress levels associated with the caller 106 and further synchronizes the stored stress levels with extracted text features.

In accordance with the embodiments, the AI server 108 includes language processing capability configured to: acquire an audio signal from the call relating to a conversation between the caller 106 and the call taker 108, identify the caller in the audio signal, extract audio and text features from the call in real time, calculate and store stress levels of the caller, from the extracted audio features, over time and synchronize the stored stress levels with the extracted text features from the call.

When one of a current calculated stress level of the caller is relatively high or a trend of the calculated stress level of the caller is increasing, the AI server 108 notifies the answering point 102 to provide a visual indication to the call taker to refrain from ending the call. When one of a current calculated stress level of the caller is relatively low or a trend of the calculated stress level of the caller is decreasing and has remained below an acceptable predetermined level for a predetermined time, then the AI server 108 notifies the answering point 102 to provide a visual indication to the call taker that the call can be ended.

The answering point 102, in response to notifications form the AI sever, may display stress levels associated with topic(s) associated with extracted text. The answering point 102 may provide visual suggestion of high stress topics and low stress topics to the call taker based on the processing of the call by the AI sever. The answering point, in response to the call processing and notifications by the AI sever, may further provide a visual indication of when the call can be ended.

The AI server 108 monitors conversation context (topics, sentiment, and coherence of the caller). The AI server further monitors audio stream features, such as speech intonation, volume and speed, crying, and pauses, to name a few. The AI server 108 further tracks the stress level of the caller over time through analysis of audio stream features and text transcripts of the call. The AI server 108 periodically extracts topics detected in the conversation. If the stress level escalates, the AI: extracts topics detected in the interval before escalation: topic_1 (Mom), topic_2 (call with a boss), topic_3 (lost wallet), which may be identified as potential stressors. The AI server monitors conversation to reject or confirm whether a topic for the caller is stressful. Topics may be categorized as stressors or removed from a potential stressor category.

In some embodiments, the AI server 108 may further generate questions to confirm that a detected topic is a stressor, e.g., "Does your Mom shout at you? Do you talk to your Mom?". Such questions may be presented for display at the answering point 102 to facilitate call analytics. Question generation by the AI server 108 and analytic of those responses can be used to determine a context with which to establish topic stressfulness.

Topics identified by the AI server as being stressful to the caller can be further categorized with a reaction type, such as, crying, agitation, aggression, to name a few. The AI server configures the information for a user interface display at the mental health answering point 102. The mental health answering point 102 may present the call taker with the identified potential stressors, established stressors and reaction type along with recommendations as to which stressors to avoid.

Hence, the AI server 108 of the embodiments advantageously determines an association between different topics and the effect of those different topics on the emotional state (e.g. suicide risk) of the caller. Recommendations are generated to avoid stressful topics for the remainder of the call interaction between call taker and caller. The AI server 108 may further supplement stress level identification and mental health topics with mental health resource recommendations (e.g. family counseling services, drug addiction help groups, to name a few) for a particular identified stressor. Such resources can be communicated to the caller. The communication system 100 advantageously facilitates independent handling of mental health calls without reliance on 911 dispatch call centers.

Figure 2:
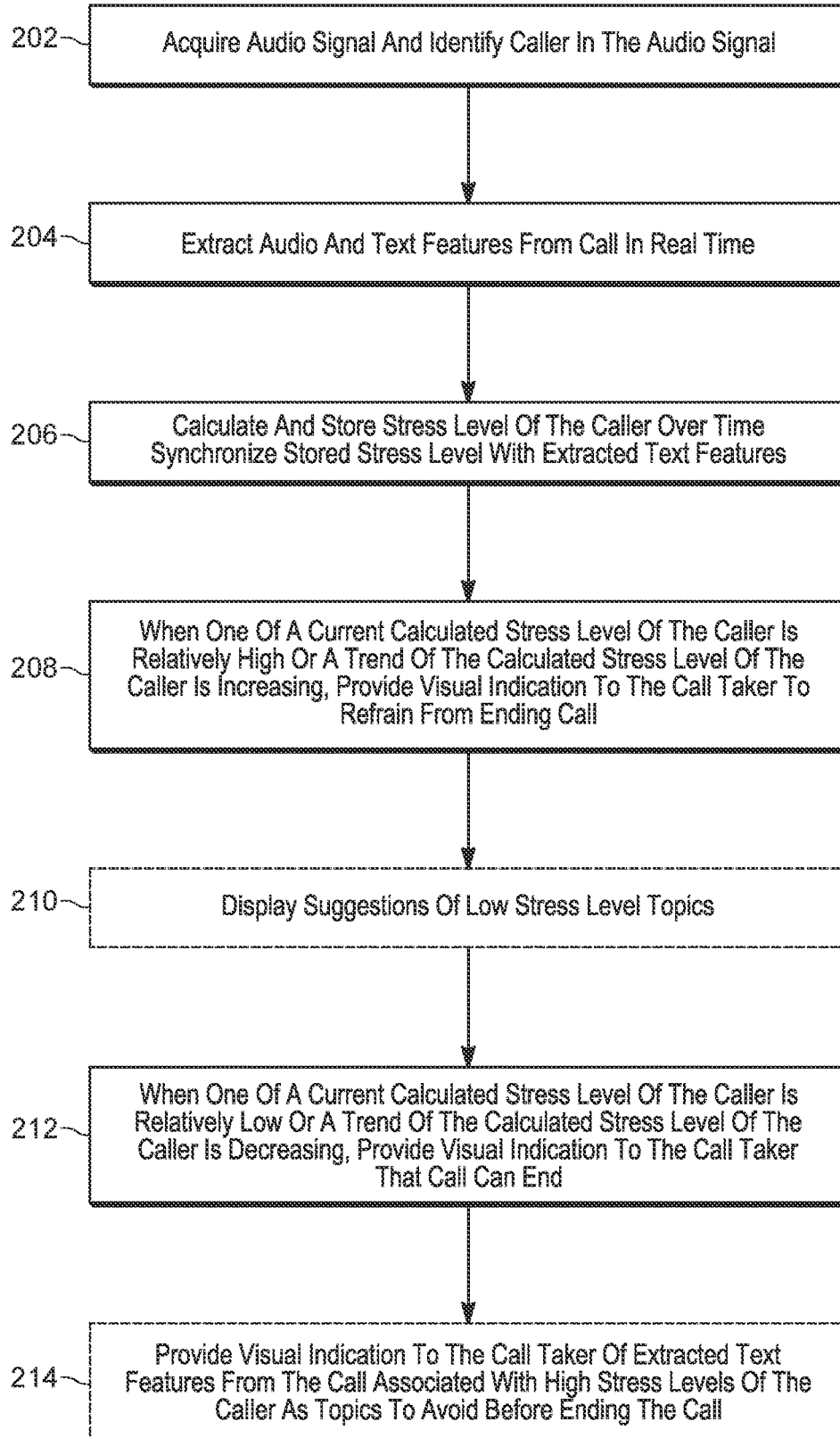
FIG. 2 is a flowchart for tracking and managing a call in accordance with some embodiments.

FIG. 2 is a flowchart for a method 200 for tracking and managing an emotional state of a caller during a call to an answering point, in accordance with some embodiments. The AI supported method begins at 202 with acquiring an audio signal from the call relating to a conversation between the caller and a call taker of the answering point and identifying audio associated with the caller in the audio signal. The method then continues at 204 with extracting audio and text features from the call in real time. In accordance with the embodiments, the method continues at 206 by calculating and storing stress levels of the caller, from the extracted audio features, over time and synchronizing the stored stress levels with the extracted text features from the call.

The method continues at 208 wherein, when one of a current calculated stress level of the caller is relatively high or a trend of the calculated stress level of the caller is increasing, providing a visual indication to the call taker, at the answering point, to refrain from ending the call. The visual indication may include displaying suggestions for low stress level topics at 210. For example, the visual indication to the call taker may include extracted text features from the call associated with low stress levels of the caller as topics to bring up.

The method continues at 212 wherein, when one of a current calculated stress level of the caller is relatively low or a trend of the calculated stress level of the caller is decreasing and remains at an acceptable predetermined level for a pre-determined time, then providing a visual indication to the call taker, at the answering point, that the call can be ended. The providing of the visual indication may further include, for example, displaying high stress level topics including extracted text features from the call associated with high stress levels of the caller as topics to avoid before ending the call.

Figure 4:
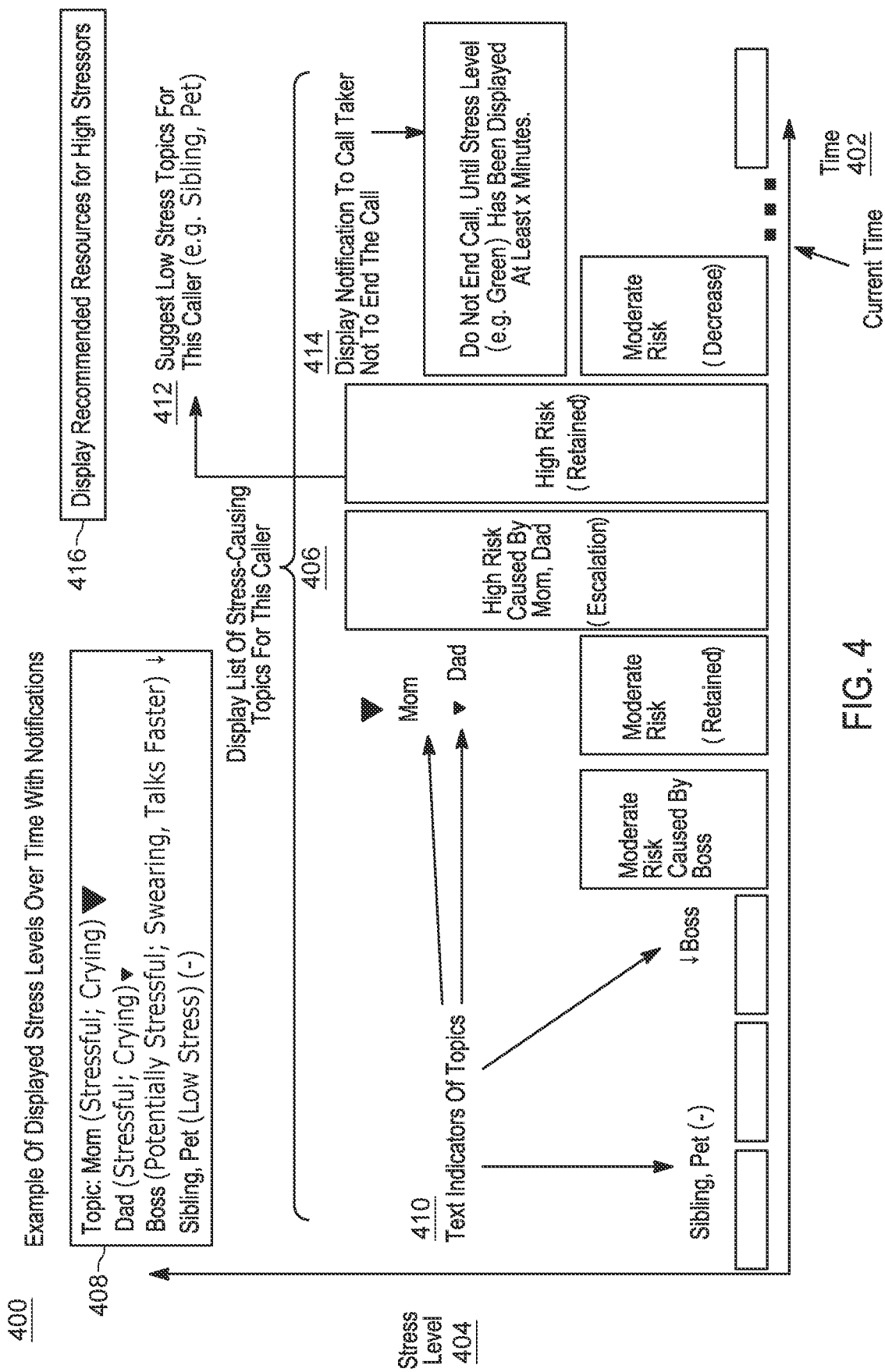
FIG. 4 is an example of a display output on a call center communication device tracking stress levels over call time along with notification alerts in accordance with some embodiments.

The method 200 may further include generating a timeline of relative caller stress level and providing a visual representation of stress level variation over time to the call taker at a display of answering point 102 of FIG. 1, as will be further described in FIG. 4. For example, the visual representation of stress level over time may include displaying stress topics associated with the caller's stress level(s) in conjunction with displaying indicators identifying low stress level, high stress, and moderate stress level, increasing stress level, and/or decreasing stress level. The timeline may further identify, on the visual representation, suggested topics for low stress levels, suggested topics to avoid; and notification to the call taker not to end the call.

FIG. 3 is an example of a table of stress level and notification options configured by the AI server 108 of FIG. 1 in accordance with some embodiments. Table 300 shows the stress level variations of high/Increasing stress level(s), decreasing stress level(s) and low stress level(s) in conjunction with various notifications.

For a high or increasing stress level (s), the AI server 108 will generate a notification to refrain from ending the call. A second notification for the high/increasing stress level may include identifying or listing text indicative of high stressors associated with the caller. A third notification for the high/increasing stress level may include identifying or listing text indicative of low stressors of the caller.

For a decreasing stress level, the AI server 108 will generate a notification indicating that the call may be ended, or ended upon reaching a particular stress level over a predetermined time duration. A second notification for the decreasing stress level(s) may include identifying or listing text indicative of high stressors associated with the caller to avoid. A third notification for the decreasing stress level may include identifying or listing text indicative of low stressors associated with the caller.

When the AI server 108 determines that the stress level(s) are sufficiently low, the AI server sends a notification to the answering point 102 that the call can be ended.

The AI server 108 may analyze and track a plurality of different stress types and varying stress levels for an individual caller throughout the call. The AI server 108 manages the manner in which the stress levels and notifications are presented at the mental health answering point 102 of FIG. 1. Relative stress levels can be presented along with text notifications identifying the stressor and the varying levels.

FIG. 4 shows an example of a displayed output at answering point 102 of FIG. 1 in accordance with some embodiments. The displayed output 400 includes a visual representation of stress level 404 across time 402 to the call taker. The visual representation is generated by the AI server 108 and communicated to the answering point 102. The visual representation of stress level 404 may further include the emotional reaction type associated therewith, such as crying, screaming, and speed of voice, to name a few. A displayed relative variation in stress level 406 may be shown in conjunction with text indicators identifying each stressor associated with the call. The AI generated representation identifies and monitors a plurality of different stressors associated with the caller, the different stressors being monitored relative to one another to identify variations in stress levels. The indicators may further identify low stress level, high stress, moderate stress level, increasing stress level, and decreasing stress level with one or more pointers, negative signs, positive signs, and/or color coding. The displayed output 400 may further include a list of stress-causing topics 408 determined to be associated with the current caller. The displayed output 400 may further include text indicators identifying the stressor type at each of the various stress levels 410. The displayed output 400 may further identify suggested topics for low stress levels 412, suggested topics to avoid, and provide notifications to the call taker not to end the call 414. The AI server may further supplement stress level identifications with mental health resource recommendations for a particular identified stressor which may further be communicated and displayed 416.

As should be appreciated from the detailed description above, the operations and functions of the AI server and system are sufficiently complex as to require their implementation on a computer system, and cannot be performed, as a practical matter, in the human mind. The devices such as set forth herein are understood as requiring and providing speed and accuracy and complexity management that are not obtainable by human mental steps, in addition to the inherently digital nature of such operations (e.g., a human mind cannot interface directly with data storage, cannot transmit or receive electronic messages, electronically encoded audio, etc., and cannot extract audio and text features from the call in real time or calculate and store stress levels of the caller, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An artificial intelligence (AI) supported method for tracking and managing a mental health state of a caller during a call to an answering point, the method comprising:
   acquiring an audio signal from the call relating to a conversation between the caller and a mental health call taker;
   identifying the caller in the audio signal;
   extracting audio and text features from the call in real time;
   calculating and storing stress levels of the caller from the extracted audio features, over time and synchronizing the stored stress levels with the extracted text features from the call by correlating specific stress level variations of the caller with corresponding extracted text features;
   generating a timeline of relative caller stress level and providing a visual representation of caller stress level variation over time to the call taker, wherein the timeline displays, relative variation in caller stress level in conjunction with the extracted text features, the extracted text features identifying each stressor associated with the call;
   when one of a current calculated stress level of the caller is relatively high or a trend of the calculated stress level of the caller is increasing, providing a visual indication on the timeline to the call taker, at the answering point, to refrain from ending the call; and
   when one of a current calculated stress level of the caller is relatively low or a trend of the calculated stress level of the caller is decreasing and remains at a predetermined acceptable level for a pre-determined time, then providing a visual indication on the timeline, to the call taker, at the answering point that the call can be ended; and wherein the mental health answering point is configured to receive the audio signal from the conversation taking place between the caller and the mental health call taker for transmission of the audio signal to an AI server.

2. The method of claim 1, wherein when the one of a current calculated stress level of the caller is relatively high or a trend of the calculated stress level of the caller is increasing, providing the visual indication to the call taker to refrain from ending the call further comprises:

generating suggestions for low stress level topics including extracted text features from the call associated with low stress levels of the caller as topics to bring up; and providing the suggestions for low stress level topics as another visual indication to the call taker.

3. The method of claim 1, wherein when the one of a current calculated stress level of the caller is relatively low or a trend of the calculated stress level of the caller is decreasing, providing the visual indication to the call taker at the answering point, that the call can be ended further comprises:

generating high stress level topics including extracted text features from the call associated with high stress levels of the caller as topics to avoid before ending the call; and providing the high stress level topics as another visual indication to the call taker.

4. The method of claim 1, wherein generating the timeline further includes:

identifying, on the visual representation, stress topics and emotional reactions associated with the caller stress level in conjunction with indicators identifying low stress level, high stress, moderate stress level, increasing stress level, and decreasing stress level.

5. The method of claim 4, further comprising identifying, on the visual representation one or more of:

suggested topics for low stress levels;

suggested topics to avoid before ending the call; and a notification to the call taker not to end the call.

6. The method of claim 1, further comprising:

generating queries, via the artificial intelligence, to determine a context associated with an identified stressor.

7. The method of claim 1, further comprising:

identifying a mental health topic associated with at least one stored stress level;

determining a mental health resource based on the identified mental health topic; and communicating the mental health resource to the call taker.

8. The method of claim 1, wherein the method is performed without reliance on a 911 dispatch call center.

9. A communication system, comprising:

a mental health answering point operating over a communications network;

an artificial intelligence server interoperable with the mental health answering point, the mental health answering point being configured to receive verbal inputs, from a conversation taking place between a call taker and a caller for transmission to the AI server, the AI server being configured to:

acquire an audio signal from the conversation between the caller and the call taker;

identify the caller in the audio signal;

extract audio and text features from the call in real time;

calculate and store stress levels of the caller from the extracted audio features, over time and synchronizing the stored stress levels with the extracted text features from the call by correlating specific stress level variations of the caller with corresponding extracted text features;

generate a timeline of relative caller stress level with associated reactions, and provide the timeline as a visual representation of stress level variation over time, to the call taker at the mental health answering point;

when one of a current calculated stress level of the caller is relatively high or a trend of the calculated stress level of the caller is increasing, provide a visual indication on the timeline to the call taker, at the answering point, to refrain from ending the call; and when one of a current calculated stress level of the caller is relatively low or a trend of the calculated stress level of the caller is decreasing and remains at a predetermined acceptable level for a pre-determined time, provide a visual indication on the timeline to the call taker, at the answering point, that the call can be ended.

10. The communication system of claim 9, wherein the visual indication to refrain from ending the call further comprises:

suggestions for low stress level topics including extracted text features from the call associated with low stress levels of the caller as topics to bring up.

11. The communication system of claim 9, wherein when the visual indication indicating that the call can be ended further comprises:

an indication of high stress level topics including extracted text features from the call associated with high stress levels of the caller as topics to avoid before ending the call.

12. The communication system of claim 9, wherein the visual representation of the timeline further includes:

stress topics associated with the caller stress level in conjunction with indicators identifying low stress level, high stress, moderate stress level, increasing stress level, and decreasing stress level.

13. The communication system of claim 12, wherein the visual representation of the timeline further includes at least one of:

suggested topics for low stress levels;

suggested topics to avoid before ending the call;

recommendations for mental health resources; and a notification to the call taker not to end the call.

14. The communication system of claim 9, wherein the AI server is further configured to generate queries to determine a context associated with an identified stressor.

15. The communication system of claim 9, wherein the AI server is further configured to:

identify a mental health topic associated with at least one stored stress level;

determine a mental health resource based on the identified mental health topic; and communicate the mental health resource to the call taker at the mental health answering point.

16. The communication system of claim 9, wherein the AI server identifies and monitors a plurality of different stressors associated with the caller, the different stressors being monitored relative to one another to identify variations in stress levels.

17. The communication system of claim 16, wherein the AI server further generates and communicates mental health resource recommendations for a particular identified stressor.

* * * * *